(12) United States Patent
Maguire et al.

(10) Patent No.: US 6,796,075 B2
(45) Date of Patent: Sep. 28, 2004

(54) RETRACTABLE FISHING NET

(76) Inventors: Mark R. Maguire, 8406 Killeen Run, Fort Wayne, IN (US) 46835; Cynthia A Maguire, 8406 Killeen Run, Fort Wayne, IN (US) 46835; Daniel E. Morken, 6331 Tolbert Ct., Fort Wayne, IN (US) 46804; Rebecca L. Morken, 6331 Tolbert Ct., Fort Wayne, IN (US) 46804

( * ) Notice: Subject to any disclaimer, the term of this patent is extended or adjusted under 35 U.S.C. 154(b) by 0 days.

(21) Appl. No.: 09/867,908

(22) Filed: May 30, 2001

(65) Prior Publication Data

US 2002/0178640 A1 Dec. 5, 2002

(51) Int. Cl.[7] .............................................. A01K 77/00
(52) U.S. Cl. .............................................. 43/12; 43/7
(58) Field of Search .................................. 43/7, 11, 12

(56) References Cited

U.S. PATENT DOCUMENTS

| | | | |
|---|---|---|---|
| 270,641 A | | 1/1883 | Dodge |
| 985,114 A | * | 2/1911 | Covell ........................... 43/12 |
| 1,077,481 A | * | 11/1913 | Levy .............................. 43/12 |
| 1,088,766 A | * | 3/1914 | Borgardt ........................ 43/12 |
| 1,169,311 A | * | 1/1916 | Walter ........................... 43/12 |
| 1,172,056 A | | 2/1916 | Schenfield |
| 1,513,990 A | * | 11/1924 | Higginbotham ................. 43/12 |
| 1,742,550 A | | 1/1930 | Mann |
| 2,115,082 A | * | 4/1938 | Phillips ......................... 43/12 |
| 2,124,952 A | * | 7/1938 | Norris ........................... 43/12 |
| 2,486,233 A | | 10/1949 | Wallingford .................... 43/12 |
| 2,619,755 A | * | 12/1952 | Henson ......................... 43/12 |
| 2,620,585 A | * | 12/1952 | Delcey .......................... 43/12 |
| 4,031,650 A | | 6/1977 | Popeil ........................... 43/12 |
| 4,574,513 A | * | 3/1986 | Wearing ........................ 43/12 |
| 5,581,929 A | * | 12/1996 | Molloy .......................... 43/12 |

* cited by examiner

*Primary Examiner*—Kurt Rowan
(74) *Attorney, Agent, or Firm*—Taylor & Aust, P.C.

(57) ABSTRACT

A retractable fishing net includes a handle, a retraction mechanism, a net support band and a netting. The handle has a grip end and a net end. The retraction mechanism is slidably mounted on the handle, the retraction mechanism being movable between the grip end and the net end. The net support band has a first band end and a second band end, the first band end and the second band end each being mounted to the retraction mechanism, the net support band thereby having a hoop shape. The net support band is mounted relative to the handle and the retraction mechanism in a manner so as to provide the net support band with a spring quality, the spring quality of the net support band acting to bias the retraction mechanism toward the net end of the handle. The netting is mounted on the net support band.

20 Claims, 8 Drawing Sheets

RETRACTABLE FISHING NET

BACKGROUND OF THE INVENTION

1. Field of the Invention

The present invention relates to a fishing net, and, more particularly, to a retractable fishing net.

2. Description of the Related Art

Fishing nets are commonly used to retrieve fish upon catching them. Such nets, depending on the size of the net and type of netting chosen, can also be used to trap and contain other animals ranging from butterflies through game animals. However, such nets tend to be rather long, making carrying and storage thereof cumbersome. Retractable fishing nets have been developed which permit such nets to be stored and carried more easily. However, none of these retractable nets are designed for self deployment, instead requiring two hands to be used in order to shift the net into its full and open position.

What is needed in the art is a retractable fishing net which has the ability to self deploy upon the release of a retention mechanism.

SUMMARY OF THE INVENTION

The present invention provides a retractable fishing net in which its netting and net support band can be easily drawn in toward an end of the fishing net handle for easier storage and carrying, yet be readily and quickly deployed back into a full, open net position.

The invention comprises, in one form thereof, a retractable fishing net including a handle, a retraction mechanism, a net support band and a netting. The handle has a grip end and a net end. The retraction mechanism is slidably mounted on the handle, the retraction mechanism being movable between the grip end and the net end. The net support band has a first band end and a second band end, the first band end and the second band end each being mounted to the retraction mechanism, the net support band thereby having a hoop shape. The net support band is mounted relative to the handle and the retraction mechanism in a manner so as to provide the net support band with a spring quality, the spring quality of the net support band acting to bias the retraction mechanism toward the net end of the handle. The netting is mounted on the net support band.

An advantage of the present invention is that the fishing net can be quickly deployed from a storage position to its full size position, allowing the net to be kept in its compact state until it is actually needed.

Another advantage is that the net can be deployed to full size using only one hand by simply pressing a release button on the handle.

Yet another advantage is that such a net can be carried while stream fishing without dragging in the water or on the rocks.

A further advantage is that all of the weight of the catch is not placed upon the end of the fishing net handle upon lifting, the weight instead being at least partially displaced onto the handle length by a retractor mechanism used to draw the fishing net into its storage position.

An even yet further advantage is that the biasing force associated with the net both allows the net to be self deployed and tends to keep the net in its full and open position once that position is reached during deployment.

A yet further advantage is that the net can be shifted to its smaller storage position once a catch is in the net in order to help prevent the escape of the catch therefrom.

A yet another advantage is that an embodiment exists which allows the net banding and, optionally, the netting to be drawn inside the handle to allow more compact storage of the retractable fishing net.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

Figure 1:
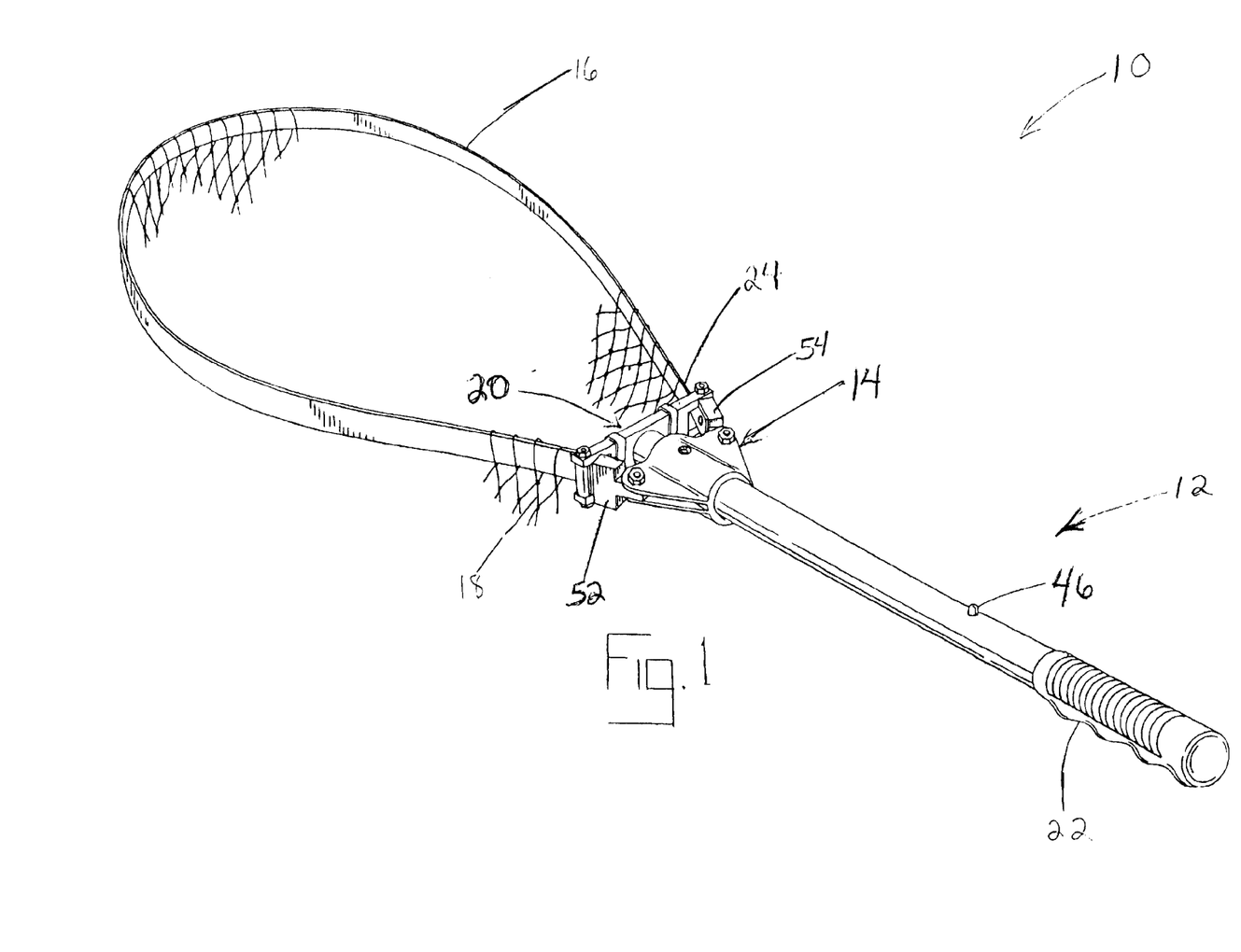
FIG. 1 is a perspective view of an embodiment of a retractable fishing net of the present invention.
Figure 2:
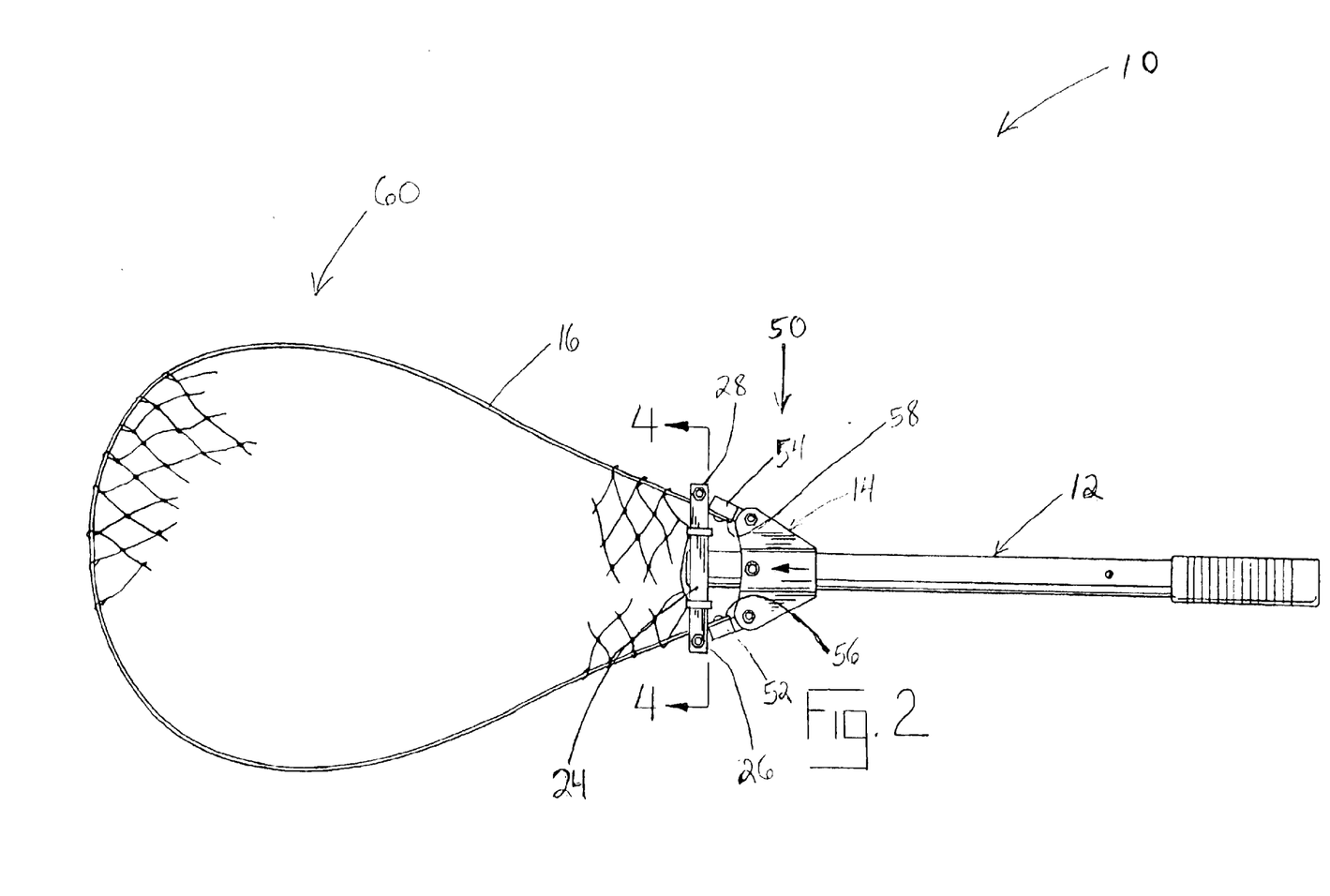
FIG. 2 is a top view of the retractable fishing net shown in FIG. 1.
Figure 3:
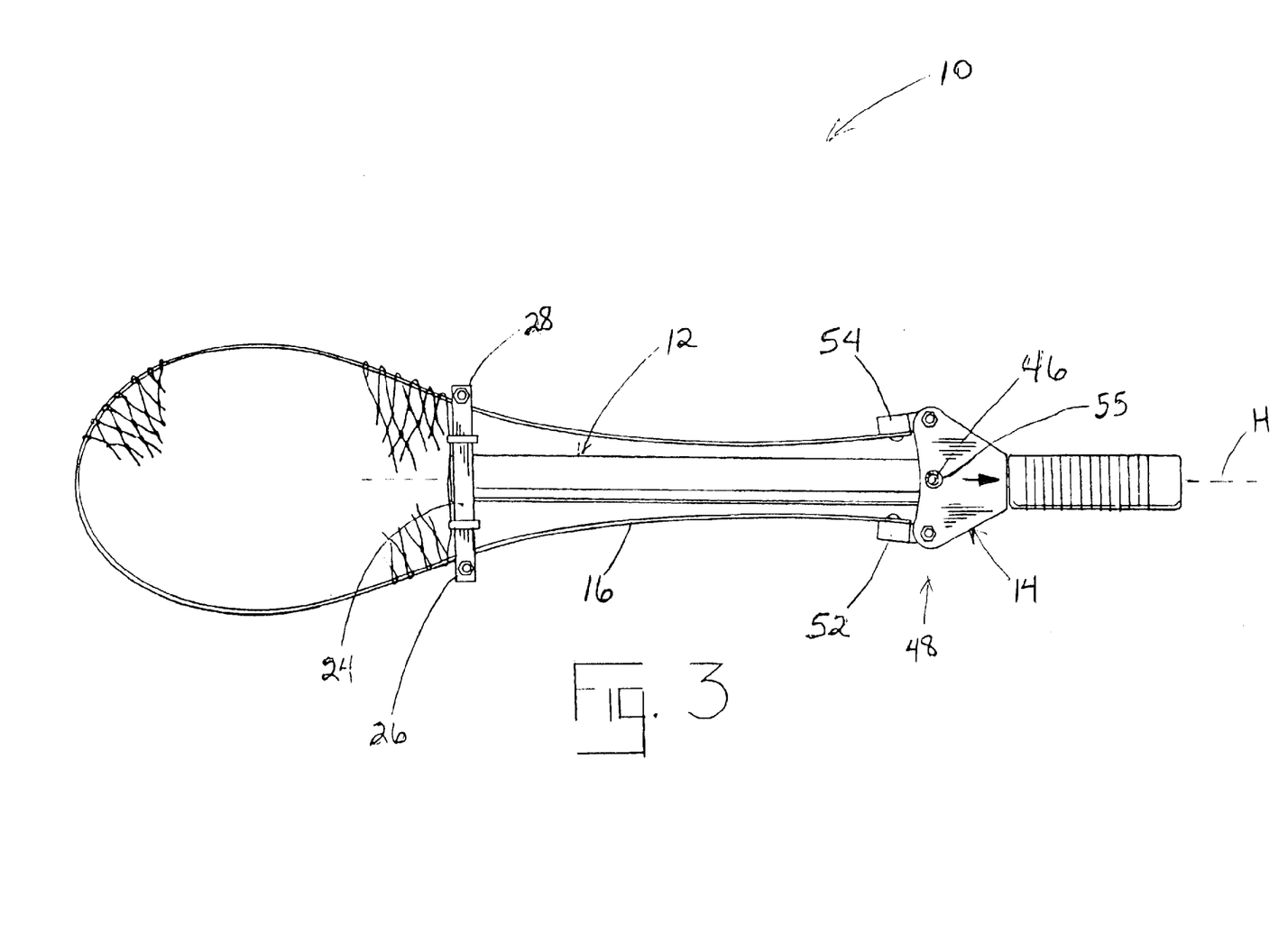
FIG. 3 is a top view of the retractable fishing net of the present invention retracted into its storage position.

Referring now to the drawings, and more particularly to FIGS. 1–3, there is shown a retractable fishing net 10 which generally includes a handle 12, a retraction mechanism 14, a net support band 16 and a netting 18.

Handle 12 has a net end 20 and a grip end 22. Net end 20 has a T bar 24 mounted rigidly thereto. T bar 24 is substantially orthogonal to handle 12 and has a first bar end 26 and a second bar end 28. First bar end 26 has a first member 30 (FIG. 4) extending therefrom, first member 30, along with first bar end 26, defining a first receiver 32. Similarly, second bar end 28 has a second member 34 extending therefrom, second member 34, along with second bar end 28, defining a second receiver 36.

Figure 4:
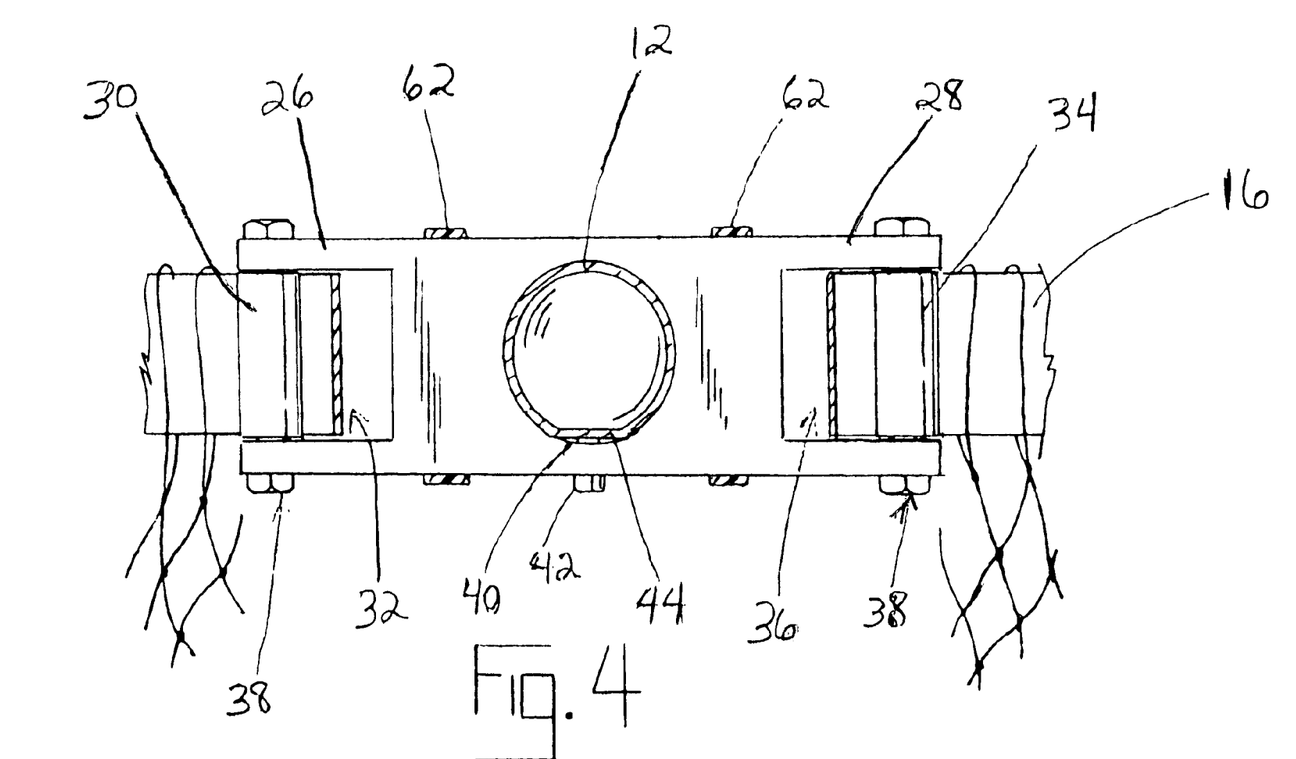
FIG. 4 is a sectional view taken along line 4—4 in FIG. 2.
Figure 5:
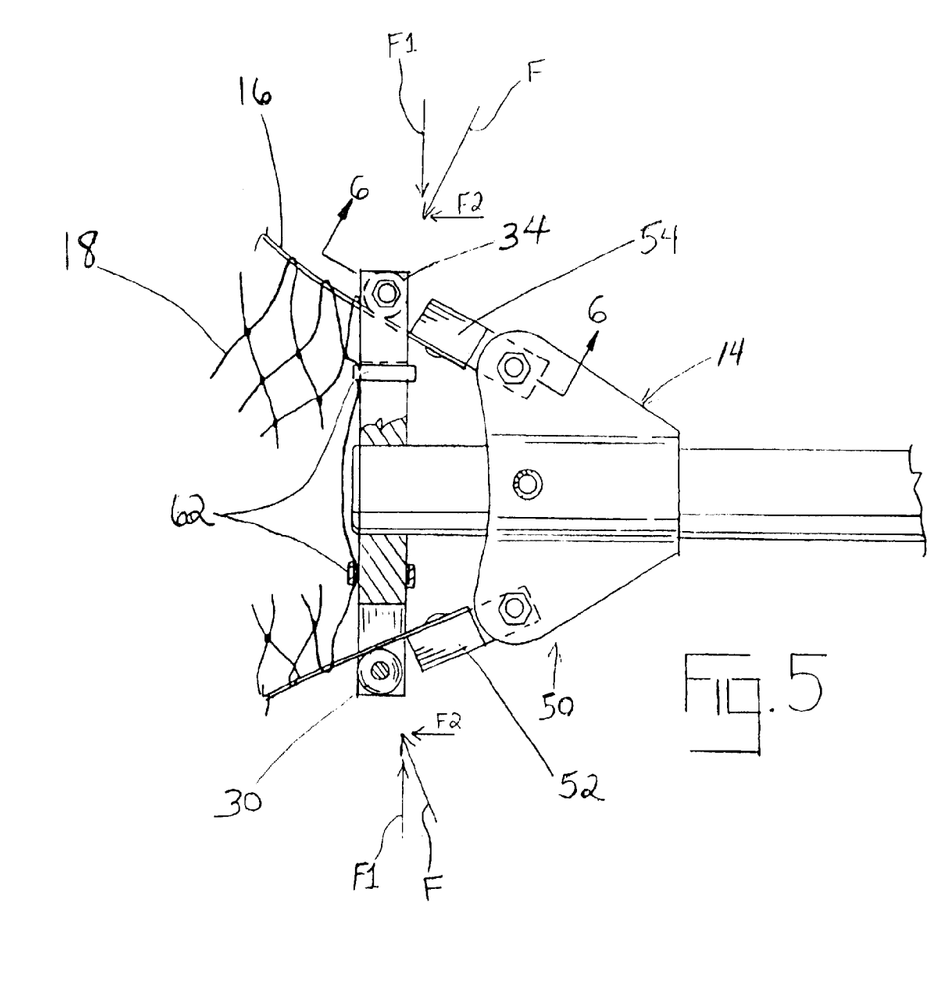
FIG. 5 is a fragmentary, exploded, partial cut away view of the retractable net shown in FIG. 2.
Figure 6:
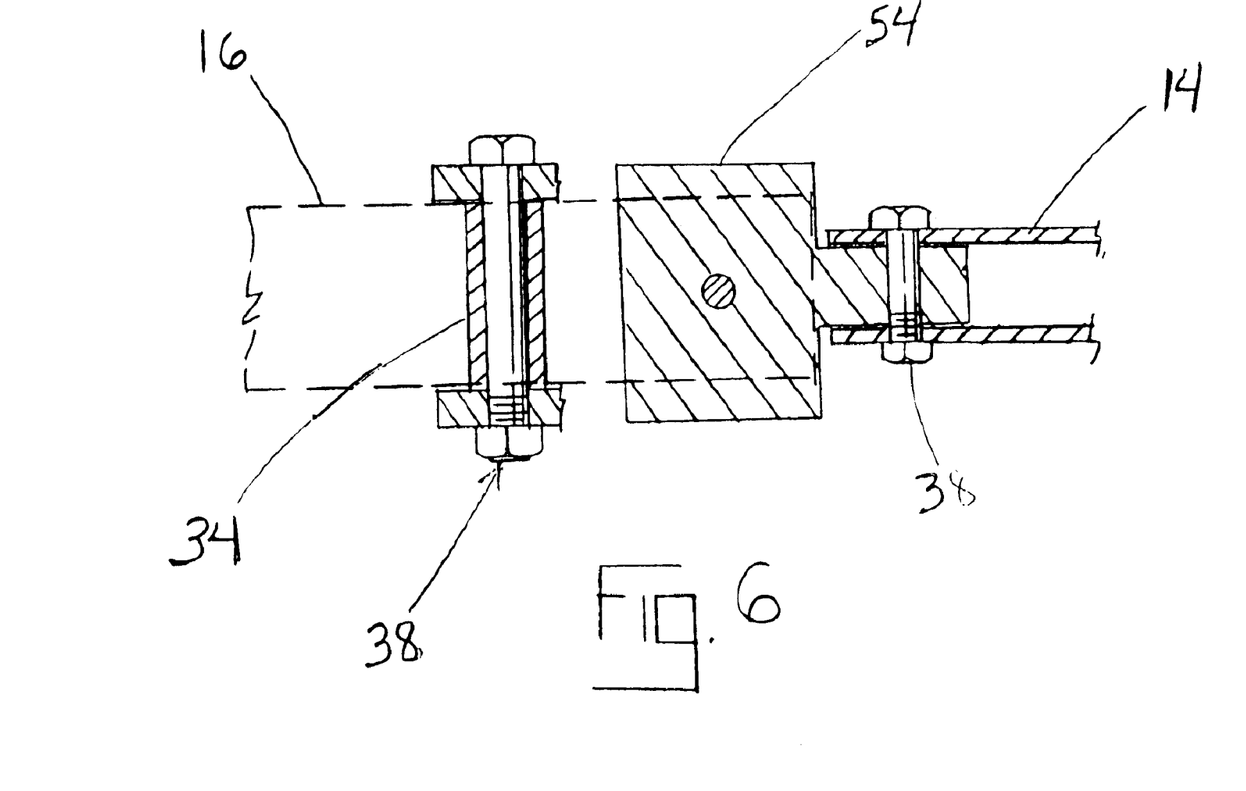
FIG. 6 is a sectional view taken along the line 6—6 in FIG. 5.

As seen in FIGS. 4–6, first member 30 and second member 34 are similarly structured and mounted rollers, in the preferred embodiment. As best shown in FIGS. 4 and 6, first member 30 and second member 34 are each held within first bar end 26 and a second bar end 28, respectively, by a nut-and-bolt combination 38. All nut-and-bolt combinations 38 of the present embodiment, while varying in size as needed, all have similar structure and function in a similar manner.

T bar 24 has a handle mount hole 40 therein located substantially centrally of first bar end 26 and a second bar end 28 for receiving net end 20 of handle 12. T bar 24 has a stabilizer mount screw 42 associated with and capable of extending into handle mount hole 40. Handle 12 is provided with a flat side 44, against which stabilizer mount screw 42 is actuated. By actuating stabilizer mount screw 42 against flat side 44 of handle 12, net end 20 is retained within T bar 24, and rotation of handle 12 relative to T bar 24 is minimized, if not prevented.

Figure 7:
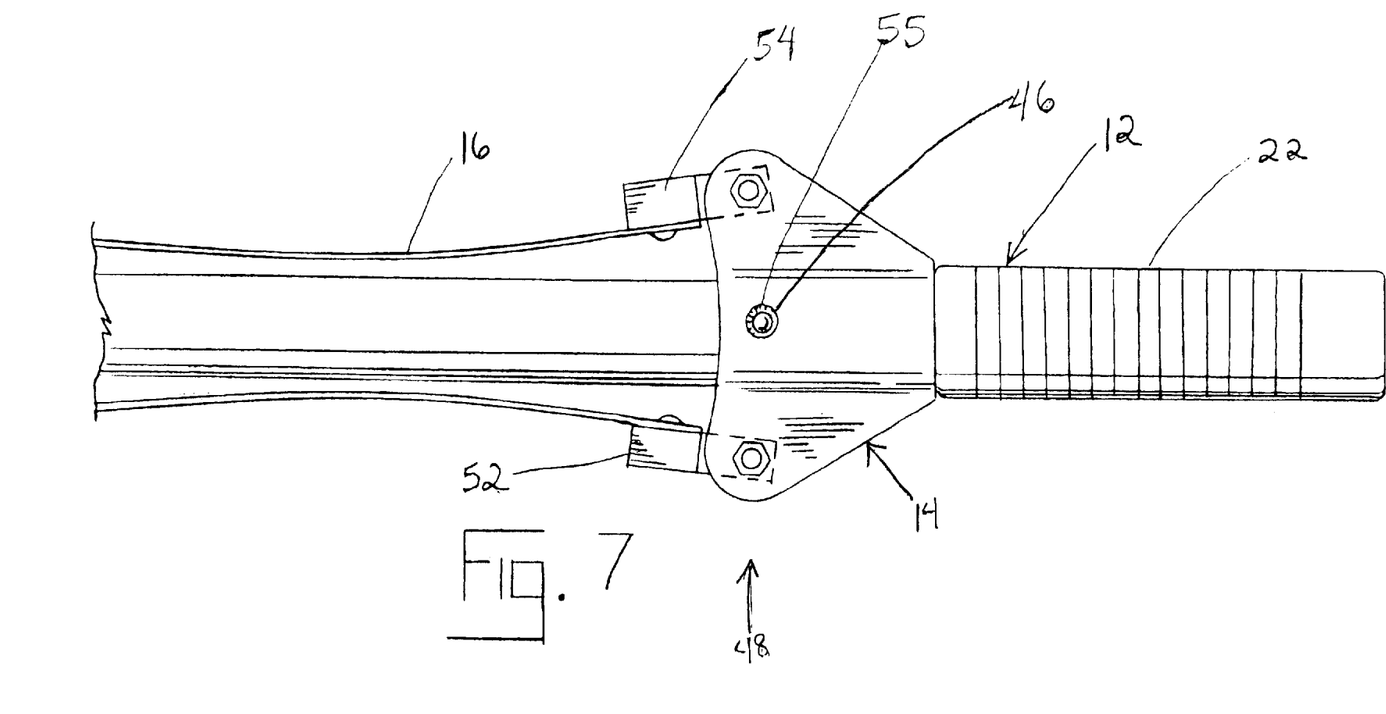
FIG. 7 is an exploded, partial view of the retractable fishing net of the present invention shown with its retraction mechanism in the storage or retracted position.

Handle 12 has a releasable retention mechanism 46 located proximate grip end 22 thereof. Releasable retention mechanism 46 is configured for retaining retraction mechanism 14 in a storage position 48 proximate grip end 22, as shown in FIGS. 3 and 7. Releasable retention mechanism 46 is preferably a spring-biased button.

Retraction mechanism 14 is slidably mounted on handle 12. Retraction mechanism 14 is movable between storage position 48 proximate grip end 22 and an operative position 50 proximate net end 20. Retraction mechanism 14 has a first mounting mechanism 52 and a second mounting mechanism 54 (a sectional view of the latter can be seen in FIG. 6) associated therewith and pivotally mounted thereto, as by nut-and-bolt combination 38. Retraction mechanism 14 is provided with a retention hole 55 therein for receiving releasable retention mechanism 46 when retraction mechanism 14 is shifted to storage position 48.

Net support band 16 has a first band end 56 and a second band end 58, first band end 56 and second band end 58 being mounted to retraction mechanism 14 by first mounting mechanism 52 and second mounting mechanism 54, respectively. Net support band 16, as a result of such mounting, assumes a hoop shape 60. First band end 56 extends through and beyond first receiver 32, while second band end 58 extends beyond and through second receiver 36.

Net support band 16 is mounted relative to handle 12 and retraction mechanism 14 in a manner so as to provide net support band 16 with a spring quality. Specifically, first member 30 of first receiver 32 and second member 34 of second receiver 36 contact and bias against net support band 16, first member 30 and second member 34 each applying a biasing force F (FIG. 5) against net support band 16.

Handle 12 has a handle axis H (as indicated in FIG. 3), each biasing force F having a first force component F1 directed perpendicularly inward toward handle axis H and a second force component F2 directed parallel to handle axis H and extending in a direction from grip end 22 toward net end 20. Second force component F2 of each biasing force F that tends to bias retraction mechanism 14 toward net end 20.

As such, the spring quality of net support band 16 provided by its mounting acts to bias retraction mechanism 14, and net support band 16 attached thereto, toward net end 20 of handle 12. Such a bias also helps to retain net support band 16 and netting 18 in a full, open position during use. However, pulling retraction mechanism 14 along handle 12 to storage position 48 draws net support band 16 and netting 18 inward toward net end 20, making retractable fishing net 10 effectively more compact.

Net support band 16 is configured to be both resilient and flexible. Preferably, net support band 16 is composed of spring steel, aluminum, stainless steel, fiberglass and/or plastic.

Netting 18 is replaceably mounted upon net support band 16. The positioning of netting 18 relative to T bar 24 is maintained by use of pull straps 62, as indicated in FIG. 5.

Prior to deployment of retractable fishing net 10, retraction mechanism 14 is retained in a storage position 48 proximate grip end 22 of handle 12 using releasable retention mechanism 46. Releasable retention mechanism 46 is actuated to permit the spring quality associated with net support band 16 to bias and thereby slidably move retraction mechanism 14 along handle 12 toward net end 20 thereof and into operative position 50.

Figure 8:
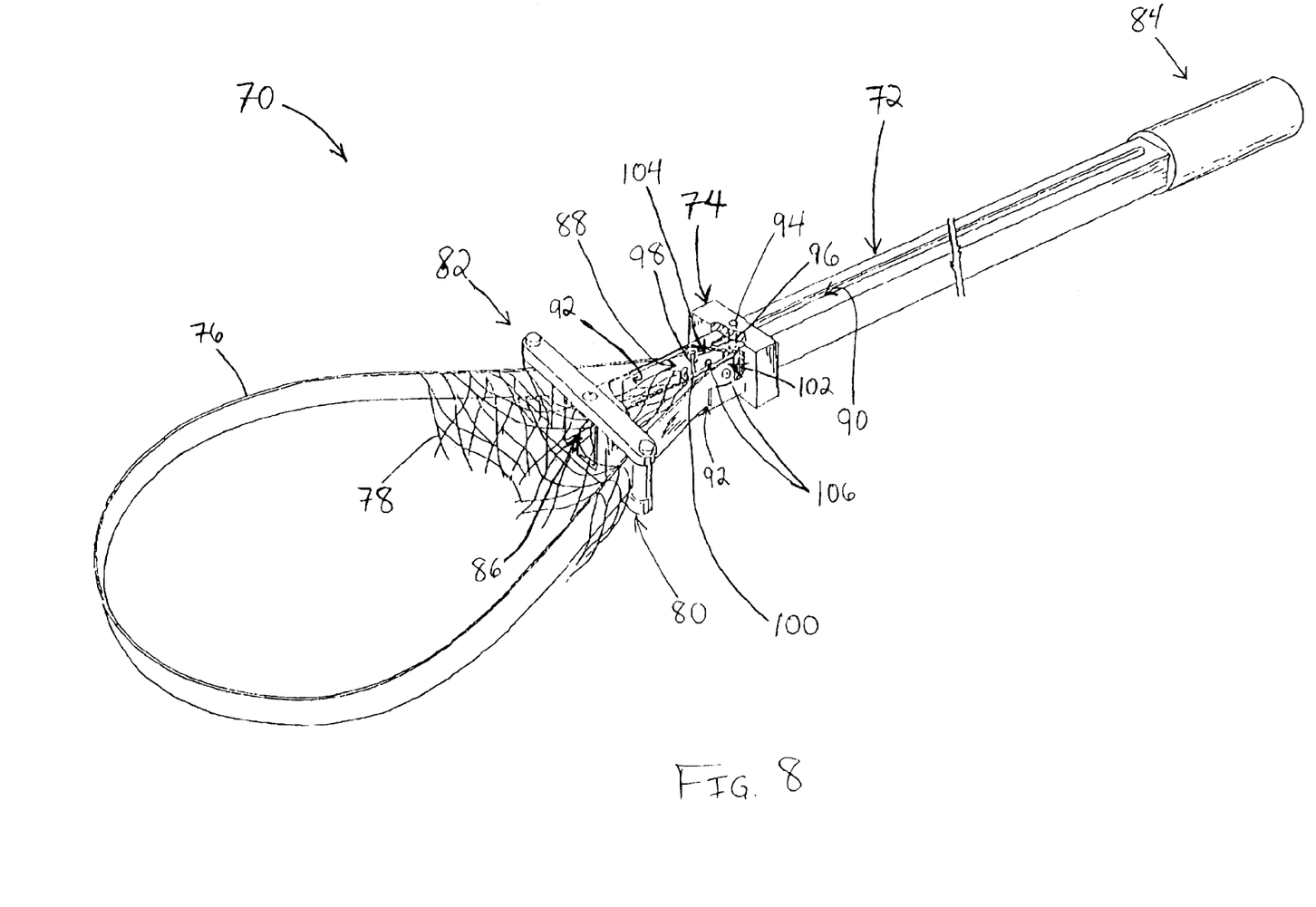
FIG. 8 is a partial cut away view of another embodiment of a retractable fishing net of the present invention.

In FIG. 8, a second embodiment of the present invention is illustrated. Retractable net 70, shown in a partially retracted position, includes a handle 72, a retraction mechanism 74, a net support band 76 and a netting 78. Retractable net 70 further includes a band biasing mechanism 80. Only those features that set apart retractable net 70 from retractable fishing net 10 are discussed in substantial detail with respect to this second embodiment.

Handle 72 has a net end 82 and a grip end 84. Handle 72 is hollow, having a net end opening 86 and a handle interior 88. Handle 72 is provided with a slot 90 therein, slot 90 extending from proximate net end 82 to proximate grip end 84. Furthermore, near net end 82, handle 72 is provided with a pair of band openings 92 (one of is shown in part). Band openings 92 are located on opposing sides of handle 72 and are sized to permit the extension of a portion of net support band 76 therethrough.

Retraction mechanism 74 has a pin mount hole 94 therein in which anchor pin 96 (shown in phantom) is mounted. Anchor pin 96 extends through slot 90 and into handle interior 88. Anchor pin 96 has a hinge 98 attached thereto, as well as a net hook 100. Hinge 98 and net hook 100 each extend toward net end 82 of handle 72.

Net hook 100 is configured for hooking netting 78 thereonto and for thereby facilitating the pulling of netting 78 into handle interior 88 upon retraction of retraction mechanism 74. Net hook 100 preferably extends slightly out of net end opening 86 when retractable net 70 is in its full, open position (not shown) in order to ease the hooking and unhooking of netting 78.

Net support band 76 includes a first band end 102 and a second band end 104. First band end 102 and second band end 104 each extend through a respective band opening 92 in handle 72. First band end 102 and second band end 104 are each mounted to hinge 98 by a connector 106. Each connector 106 may be a nut-and-bolt combination, a rivet, a pin or some other mechanical fastener. Since first band end 102 and second band end 104 are connected to hinge 98, retraction mechanism 74 is thereby configured for pulling at least a portion of net support band 76 into handle interior 88 upon moving retraction mechanism 74 toward grip end 84.

Various alternatives (not shown) fall within the scope of the present invention. For example, T bar 24 may be mechanically, adhesively and/or metallurgically (i.e., soldered, brazed and/or welded) attached to net end 20 either in addition to or in replacement of stabilizer mount screw 42. First receiver 32 and second receiver 36 could be formed by attaching an additional extension device onto first bar end 26 and second bar end 28, respectively. Additionally, while not necessarily preferred, first member 30 and second member 34 could each be a static member, such as a rounded post or an unthreaded portion of a bolt. Further, various sizes of nets and types of nettings are contemplated, dependent upon the size of the game to be caught, and the intended use of the net (i.e., fly fishing, deep-sea fishing, trapping, etc.). In a manner similar to that shown in the first embodiment, handle 72 and retraction mechanism 74 are preferably provided with, respectively, a releasable retention mechanism and retention mount hole (neither of which are shown in FIG. 7) for selectively holding retraction mechanism 74 in a fully retracted position (not shown in FIG. 7).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A retractable fishing net, comprising:
    a handle having a grip end and a net end;
    a retraction mechanism slidably mounted on said handle, said retraction mechanism being movable between said grip end and said net end;
    a flexible net support band having a first band end and a second band end, said first band end and said second band end each being mounted to said retraction mechanism internal to said handle, said net support band thereby having a hoop shape, said net support band being mounted relative to said handle and said retraction mechanism in a manner so as to provide said net support band with a spring quality, a portion of said net support band being exterior to said handle, said spring quality of said net support band acting to bias said retraction mechanism toward said net end of said handle; and
    a netting mounted on said net support band, said net end having a plurality of openings including a net opening and two band openings, said net opening and said two band openings separate from each other, said netting connected to said retraction mechanism through said net opening and said net support band passing through said two band openings.

2. The retractable net of claim 1, wherein said handle has a releasable retention mechanism located proximate said grip end, said releasable retention mechanism configured for retaining said retraction mechanism in a position proximate said grip end.

3. The retractable net of claim 2, wherein said releasable retention mechanism is a spring-biased button, said retraction mechanism having a receiver hole therein for receiving said spring-biased button.

4. The retractable net of claim 1, wherein retraction mechanism includes a first mounting mechanism and a second mounting mechanism, said first band end being pivotally mounted with respect to said first mounting mechanism, said second band end being pivotally mounted with respect to said second mounting mechanism.

5. The retractable net of claim 1, wherein said handle further includes a T bar mounted rigidly thereto at said net end thereof, said T bar being substantially orthogonal to said handle, said T bar having a first bar end and a second bar end, said first bar end having a first member extending therefrom, said first member defining a first receiver, said second bar end having a second member extending therefrom, said second member defining a second receiver.

6. The retractable net of claim 5, wherein said first band end extends beyond said first receiver, said second band end extending beyond said second receiver, said first member of said first receiver and said second member of said second receiver each contacting and biasing against said net support band, said first member of said first receiver and said second member of said second receiver each applying a biasing force against said net support band.

7. The retractable net of claim 6, wherein said handle has a handle axis, each biasing force having a first force component directed perpendicularly inward toward said handle axis and a second force component directed parallel to said handle axis and extending in a direction from said grip end toward said net end, said second force component of each biasing force thereby tending to bias said retraction mechanism toward said net end.

8. The retractable net of claim 5, wherein said first member of said first receiver and said second member of said second receiver each are rollers.

9. The retractable net of claim 1, wherein said net support band is configured to be both resilient and flexible.

10. The retractable net of claim 9, wherein said net support band is composed of at least one of spring steel, aluminum, stainless steel, fiberglass and plastic.

11. The retractable net of claim 1, wherein said handle is hollow, said handle having a handle interior and a slot therein, said slot extending from proximate said net end to proximate said grip end of said handle, said handle further having a pair of band openings therein, said band openings being positioned proximate said net end on opposing sides of said handle, each said band opening receiving one of said first band end and said second band end therethrough, said retraction mechanism including an anchor pin, said anchor pin extending through said slot and into said handle interior, said first band end and said second band end each being coupled to said anchor pin.

12. The retractable net of claim 11, further comprising a hinge coupled to said anchor pin, said first band end and said second band end each being coupled to said hinge.

13. The retractable net of claim 11, further comprising a net hook coupled to said anchor pin, said net hook extending toward said net end of said handle, said handle including a net end opening capable of receiving said netting thereinto.

14. A retractable fishing net, comprising:
    a handle having a grip end and a net end, said net end having a T bar mounted rigidly thereto, said T bar being substantially orthogonal to said handle, said T bar having a first bar end and a second bar end, a first member extending from said first bar end, said first member defining a first receiver, a second member extending from said second bar end, said second member defining a second receiver;
    a retraction mechanism slidably mounted on said handle, said retraction mechanism being movable between said grip end and said net end;
    a flexible net support band having a first band end and a second band end, said first band end extending beyond said first receiver and mounted to said retraction mechanism internal to said handle, said second band end extending beyond said second receiver and mounted to said retraction mechanism, said net support band thereby having a hoop shape, said net support band biasing against each of said first member of said first receiver and said second member of said second receiver; and
    a netting mounted on said net support band, said net end having a plurality of openings including a net opening and two band openings, said net opening and said two band openings separate from each other, said netting connected to said retraction mechanism through said net opening and said net support band passing through said two band openings.

15. The retractable net of claim 14, wherein said handle has a releasable retention mechanism located proximate said grip end, said releasable retention mechanism configured for retaining said retraction mechanism in a position proximate said grip end.

16. The retractable net of claim 15, wherein said releasable retention mechanism is a spring-biased button, said retraction mechanism having a receiver hole therein for receiving said spring-biased button.

17. The retractable net of claim 14, wherein said first member of said first receiver and said second member of said second receiver each are rollers.

18. The retractable net of claim 14, wherein said net support band is configured to be both resilient and flexible.

19. A method of deploying a retractable fishing net, comprising:

- providing a handle having a grip end and a net end, said handle having a releasable retention mechanism located proximate said grip end;
- providing a retraction mechanism slidably mounted on said handle, said retraction mechanism being movable between said grip end and said net end,
- providing a flexible net support band having a first band end and a second band end, said first band end and said second band end each being mounted to said retraction mechanism internal to said handle, said net support band thereby having a hoop shape, said net support band being mounted relative to said handle and said retraction mechanism in a manner so as to provide said net support band with a spring quality, said spring quality of said net support band acting to bias said retraction mechanism toward said net end of said handle;
- providing a netting upon said net support band, said net end having a plurality of openings including a net opening and two band openings, said net opening and said two band openings separate from each other, said netting connected to said retraction mechanism through said net opening and said net support band passing through said two band openings;
- retaining said retraction mechanism in a position proximate said grip end using said retention mechanism; and
- releasing said retention mechanism to permit said spring quality to bias and thereby move said retraction mechanism toward said net end of said handle, thereby moving said net support band through said two band openings and said netting through said net opening.

20. The retractable net of claim 14, wherein retraction mechanism includes a first mounting mechanism and a second mounting mechanism, said first band end being pivotally mounted with respect to said first mounting mechanism, said second band end being pivotally mounted with respect to said second mounting mechanism.

\* \* \* \* \*